United States Patent [19]

Tsuruoka et al.

[11] Patent Number: 5,444,118

[45] Date of Patent: Aug. 22, 1995

[54] PROCESS FOR PRODUCING COPOLYMER LATEX AND PAPER COATING COMPOSITION, CARPET BACKING COMPOSITION OR ADHESIVE COMPOSITION COMPRISING SAID LATEX

[75] Inventors: Katsuhiko Tsuruoka; Shozo Nishida; Masafumi Wakamori; Takemitsu Tanaka; Masaaki Yada; Osamu Ishikawa; Hiroyuki Miki, all of Yokkaichi, Japan

[73] Assignee: Japan Synthetic Rubber Co., Ltd., Tokyo, Japan

[21] Appl. No.: 34,210

[22] Filed: Mar. 19, 1993

Related U.S. Application Data

[63] Continuation of Ser. No. 540,948, Jun. 20, 1990, abandoned.

[30] Foreign Application Priority Data

| | | | |
|---|---|---|---|
| Jun. 30, 1989 | [JP] | Japan | 1-169142 |
| Nov. 16, 1989 | [JP] | Japan | 1-298581 |
| Nov. 24, 1989 | [JP] | Japan | 1-306056 |
| Nov. 24, 1989 | [JP] | Japan | 1-306057 |
| Dec. 15, 1989 | [JP] | Japan | 1-326930 |
| Dec. 18, 1989 | [JP] | Japan | 1-327973 |

[51] Int. Cl.$^6$ ............................................. C08L 31/00
[52] U.S. Cl. ................................ 524/828; 524/832; 524/833; 524/834
[58] Field of Search ............. 524/828, 832, 833, 834

[56] References Cited

U.S. PATENT DOCUMENTS

| | | |
|---|---|---|
| 3,256,234 | 6/1966 | Miller . |
| 4,445,959 | 5/1984 | Hombach et al. ............ 524/750 |

FOREIGN PATENT DOCUMENTS

| | | |
|---|---|---|
| 036170 | 9/1981 | European Pat. Off. . |
| 186926 | 7/1986 | European Pat. Off. . |
| 1141685 | 9/1957 | France . |
| 50-32280 | 3/1975 | Japan . |
| 50-103586 | 8/1975 | Japan . |
| 53-121892 | 10/1978 | Japan . |
| 795706 | 5/1958 | United Kingdom . |

OTHER PUBLICATIONS

Database Chemical Abstracts, (Host:STN), abstract No. 77 (26) 165135a, Columbus, Ohio, U.S.; & Hem. Ind. 26 (8), 309–13 (V. Jarm et al).

*Primary Examiner*—Peter D. Mulcahy
*Attorney, Agent, or Firm*—Oblon, Spivak, McClelland, Maier, & Neustadt

[57] ABSTRACT

A two-stage process for producing a copolymer, comprising emulsion polymerizing (a) a 2–80% by weight of a conjugated diene compound, (b) 0.1–10% by weight of an ethylenically unsaturated carboxylic acid, and (c) 10–97.9% by weight of an ethylenically unsaturated compound other than the components (a) and (b) in the presence of (d) and α-methylstyrene dimer, wherein in the first stage, 10–50% by weight of the total amount of the components (a), (b) and (c) are added and polymerized at 70°–80° C. for 2–6 hours after the addition of the monomer, and after said first stage, 50–90% by weight of the total amount of the components (a), (b) and (c) are continuously fed and polymerized in a second stage.

20 Claims, 1 Drawing Sheet

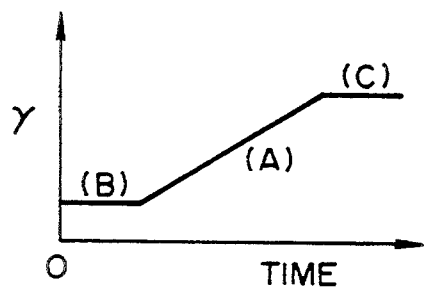
F I G. 1
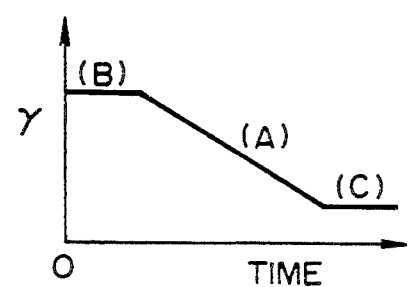
F I G. 2
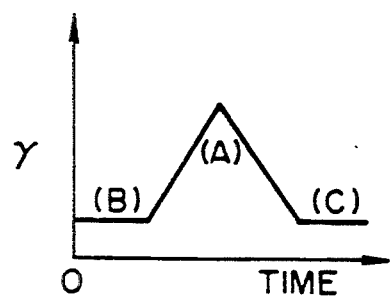
F I G. 3
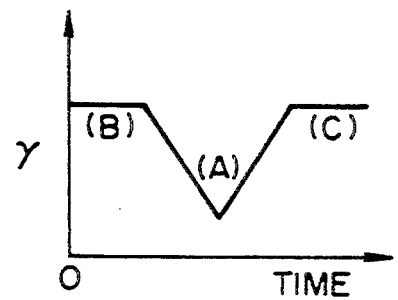
F I G. 4

PROCESS FOR PRODUCING COPOLYMER LATEX AND PAPER COATING COMPOSITION, CARPET BACKING COMPOSITION OR ADHESIVE COMPOSITION COMPRISING SAID LATEX

This application is a Continuation of application Ser. No. 07/540,948, filed on Jun. 20, 1990, now abandoned.

This invention relates to a process for producing a polymer latex which is very low in content of fine coagula formed during the polymerization, excellent in mechanical stability, excellent in bonding strength and blister resistance when used in various applications utilizing the adhesivity, and more sufficiently provided with properties required by various applications, as well as to a paper coating composition, a carpet backing composition and an adhesive composition all comprising said copolymer latex.

Copolymer latexes obtained by emulsion-polymerizing a monomer mixture comprising, as essential components, conjugated diene compounds, alkyl (meth)acrylates, etc., are similar to natural rubber latex and have adhesivity; accordingly, such copolymer latexes are in wide use in various applications utilizing the properties. The applications include, for example, a paper coating composition, a carpet backing composition, adhesive compositions of various types, a paint, a cement modifier and an asphalt modifier.

All of these applications have strong requirements for higher productivity and higher quality, making increasingly severe the production conditions and use conditions of the copolymer latex used in the applications.

In order to meet these severe conditions, the copolymer latexes are required to (a) contain fine coagula in an amount as small as possible because they cause deterioration of latex quality, (b) have excellent mechanical stability throughout all the steps of production and use and, in various applications, (c) give rise to no blister, that is, have blister resistance during the high-temperature-drying (a drying step is necessary in most of the applications) and have an excellent bonding strength.

Conventional copolymer latexes, however, are not sufficient in content of fine coagula, mechanical stability, blister resistance, bonding strength and water resistance.

Thus, conventional copolymer latexes have problems in that they are not sufficient in each of content of fine coagula, mechanical stability, blister resistance, bonding strength and water resistance and have no sufficient properties required by applications utilizing the adhesivity of copolymer latex.

The present inventors have found that a copolymer latex obtained by emulsion-polymerizing specific monomers in the presence of a specific chain transfer agent is very low in content of fine coagula and highly improved in mechanical stability, blister resistance, bonding strength and water resistance and, when used in various applications, more sufficiently provided with the properties required by the applications.

An object of this invention is to provide a process for producing a copolymer latex very low in content of fine coagula.

Another object of this invention is to provide a paper coating composition comprising said copolymer latex, a pigment and, as necessary, a water-soluble high-molecular compound.

A further object of this invention is to provide a carpet backing agent comprising said copolymer latex and an inorganic filler.

A still further object of this invention is to provide an adhesive comprising said copolymer latex and a thermoplastic polymer.

Other objects and advantages of this invention will become apparent from the following description and the accompanying drawings. In the accompanying drawings, FIG. 1 to FIG. 4 are explanatory drawings each showing the amount of chain transfer agent added per unit time.

According to this invention, there is provided a process for producing a copolymer latex having a gel content of 5% by weight or more, comprising emulsion-polymerizing (a) 2–80% by weight of a conjugated diene compound,
(b) 0.1–10% by weight of an ethylenically unsaturated carboxylic acid, and
(c) 10–97.9% by weight of an ethylenically unsaturated compound other than the components (a) and (b) in the presence of
(d) a chain transfer agent comprising at least one member selected from the group consisting of the following (d-1) to (d-6):
  (d-1) an α-methylstyrene dimer,
  (d-2) at least one disulfide compound selected from the group consisting of dimethylxanthogen disulfide, diethylxanthogen disulfide and thiuram disulfide,
  (d-3) at least one hydrocarbon compound selected from the group consisting of hydrocarbon compounds having an aromatic ring and at least one saturated carbon atom directly bonded to the ring, said saturated carbon atom having bonded thereto at least one hydrogen atom and forming an aliphatic ring, and alicyclic hydrocarbon compounds having in the ring at least two carbon-to-carbon double bonds and at least one saturated carbon atom adjacent to the carbon-to-carbon double bonds and forming the aliphatic ring, said saturated carbon atom having at least one hydrogen atom,
  (d-4) an unsaturated heterocyclic compound having in the heterocyclic ring a carbon-to-carbon double bond and at least one saturated carbon atom adjacent to the carbon-to-carbon double bond and forming the heterocyclic ring, said saturated carbon atom having at least one hydrogen atom,
  (d-5) a hydrocarbon compound having at least two unsaturated bonds and at least one saturated carbon atom adjacent to the carbon atoms taking part in the two unsaturated bonds, said saturated carbon atom forming no ring structure and having at least one hydrogen atom, and
  (d-6) a mixture consisting of (X) 5–95% by weight of at least one compound selected from the group consisting of terpinolene, α-terpinene, γ-terpinene and dipentene and (Y) 95–5% by weight of at least one compound selected from the group consisting of alkylmercaptans, halogenated hydrocarbons and disulfide compounds.

This invention is described in detail below.

(Monomer components of copolymer latex)
  (a) Conjugated diene compound

Specific examples of the conjugated diene compound include butadiene, isoprene, 2-chloro-1,3-butadiene and 2-methyl-1,3-butadiene. These can be used alone or in combination of two or more. Of them, butadiene is particularly preferable.

The conjugated diene compound is used to impart adequate elasticity and film hardness to the resulting copolymer. The amount of the compound used is selected from the range of 2–80% by weight, preferably 10–70% by weight, more preferably 20–65% by weight, most preferably 20–60% by weight, based on the total monomers. When the amount is less than 2% by weight, no sufficient elasticity and bonding strength can be obtained. When the amount is more than 80% by weight, water resistance and bonding strength are low although film hardness is imparted.

(b) Ethylenically unsaturated carboxylic acid

Specific examples of the ethylenically unsaturated carboxylic acid include monocarboxylic acids such as acrylic acid, methacrylic acid, crotonic acid and the like; dicarboxylic acids such as maleic acid, fumaric acid, itaconic acid and the like; and monoesters such as methyl maleate, methyl itaconate, β-methacryloxyethyl acid hexahydrophthalate and the like. Dicarboxylic acid anhydrides can also be used. These can be used alone or in combination of two or more. The component (b) is preferably a dicarboxylic acid and particularly preferably a combination of a dicarboxylic acid and a monocarboxylic acid.

The amount of the ethylenically unsaturated carboxylic acid used is selected from the range of 0.1–10% by weight, preferably 0.5–7% by weight, particularly preferably 1–7% by weight, based on the total monomers. When the amount is less than 0.1% by weight, bonding strength and mechanical stability of copolymer latex are low. When the amount is more than 10% by weight, viscosity of copolymer latex is high, making its handling difficult and reducing its workability.

(c) Ethylenically unsaturated compound other than the components (a) and (b)

As the component (c), there can be used aromatic alkenyl compounds, ethylenically unsaturated carboxylic acid ester compounds, ethylenically unsaturated carboxylic acid amide compounds, alkenyl cyanide compounds, ethylenically unsaturated amine compounds, etc.

The aromatic alkenyl compounds include styrene, α-methylstyrene, vinyltoluene, p-methylstyrene, etc. Styrene is preferable.

The ethylenically unsaturated carboxylic acid ester compounds include alkyl esters of ethylenically unsaturated carboxylic acids, such as methyl (meth)acrylate, ethyl (meth)acrylate, propyl (meth)acrylate, butyl (meth)acrylate, 2-ethylhexyl (meth)acrylate and the like; hydroxyalkyl esters of ethylenically unsaturated carboxylic acids, such as 2-hydroxyethyl (meth)acrylate, 3-hydroxypropyl (meth)acrylate, 2,3,4,5,6-pentahydroxyhexyl (meth)acrylate, 2,3,4,5-tetrahydroxypentyl (meth)acrylate and the like [2-hydroxyethyl (meth)acrylate is preferable]; vinyl esters of ethylenically unsaturated carboxylic acids, such as vinyl acetate and the like; and so forth.

The ethylenically unsaturated carboxylic acid amide compounds include (meth)acrylamide, N-methylol(meth)acrylamide, diacetone(meth)acrylamide, crotonamide, itaconamide, methylitaconamide, maleic acid monoamide, methylenedi(meth)acrylamide and dialkyl(meth)acrylamides such as N,N'-dimethyl(meth)acrylamide, N,N'-diethyl(meth)acrylamide and the like. Of these, there are preferred acrylamide, methacrylamide, N-methylolacrylamide and N,N'-dimethylacrylamide.

The alkenyl cyanide compounds include 2-cyanoethyl (meth)acrylate, acrylonitrile, methacrylonitrile, α-chloroacrylonitrile, etc.

The ethylenically unsaturated amine compounds include methylaminoethyl (meth)acrylate, dimethylaminoethyl (meth)acrylate, dimethylaminopropyl (meth)acrylate, diethylaminoethyl (meth)acrylate, dibutylaminoethyl (meth)acrylate, dimethylaminoethyl (meth)acrylate, dimethylaminopropyl (meth)acrylate, 2-vinylpyridine, 4-vinylpyridine, etc.

The component (c) is used to impart adequate hardness, elasticity and water resistance to the resulting copolymer. The amount of the component (c) used is selected from the range of 10–97.9% by weight, preferably 33–79.5% by weight, based on the total monomers. When the amount is less than 10% by weight, water resistance is poor. When the amount is more than 97.9% by weight, the copolymer is too hard and its adhesion strength is low.

The components (a), (b) and (c) are used ordinarily in the above amount ranges; however, their amounts are preferably selected in more specific ranges and the component (c) is preferably selected from more specific compounds, depending upon the applications of the resulting copolymer latex.

For example, when the amount of the component (a) used is 10–60% by weight, preferably 20–55% by weight, the amount of the component (b) used is 0.5–10% by weight, preferably 1–7% by weight, and there are used, as the component (c), an aromatic alkenyl compound in an amount of 10–65% by weight, preferably 30–60% by weight, based on the total monomers, and an ethylenically unsaturated carboxylic acid amide and/or a hydroxyalkyl (meth)acrylate in an amount of 0.1–10% by weight, preferably 1–8% by weight, based on the total monomers, there can be obtained a copolymer latex (hereinafter referred to as "specific latex I") suitable for use in paper coating composition for gate roll.

Further, when together with the above components (a) and (b), there are used, as the component (c), an ethylenically unsaturated amine compound in an amount of 0.1–10% by weight, preferably 0.5–7% by weight based on the total monomers, there can be obtained a copolymer latex (hereinafter referred to as "specific latex II") suitable for use in paper coating composition for offset printing.

Furthermore, when the amount of the component (a) used is 2–80% by weight, preferably 0.2–60% by weight, the amount of the component (b) used is 0.1–10% by weight, preferably 1–7% by weight, and there is used, as the component (c), an alkenyl cyanide compound in an amount of 0.5–40% by weight, preferably 1–40% by weight based on the total monomers, there can be obtained a copolymer latex (hereinafter referred to as "specific latex III") suitable for use in paper coating composition with excellent gloss as well as in car mat.

Component (d)

Component (d-1)

The α-methylstyrene dimer includes, as isomers, 2-4-diphenyl-4-methyl-1-pentene (hereinafter referred to as "DPMP-1"), 2,4-diphenyl-4-methyl-2-pentene (hereinafter referred to as "DPMP-2") and 1,1,3-trimethyl-3- phenylindane (hereinafter referred to as "TMPI"). The composition of the α-methylstyrene dimer consists of preferably 40% by weight or more of DPMP-1 and 60% by weight or less of DPMP-2 and/or TMPI, more preferably 50% by weight of DPMP-1 and 50% by weight or less of DPMP-2 and/or TMPI, particularly preferably 70% by weight or more of DPMP-1 and 30% by weight or less of DPMP-2 and/or TMPI. The higher the ratio of DPMP-1 in α-methylstyrene dimer, the higher the chain transfer effect of the dimer.

The α-methylstyrene may contain impurities, for example, unreacted α-methylstyrene dimer and α-methylstyrene oligomers and/or polymers other than DPMP-1, DPMP-2 and TMPI to the extent that the objects of this invention are not impaired.

When the α-methylstyrene dimer is used as the component (d-1), it may be used in an unpurified state just after the synthesis as long as it exhibits the intended purpose.

Component (d-2)

The component (d-2) is at least one disulfide compound selected from the group consisting of dimethylxanthogen disulfide, diethylxanthogen disulfide and thiuram disulfide.

Of the disulfide compounds, the thiuram disulfide is represented by the following general formula (I):

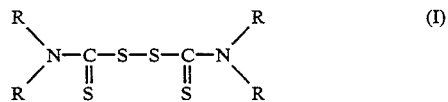

wherein four R's which may be the same or different, are each an alkyl group of 1–6 carbon atoms, and the two R's bonded to the same nitrogen atom may be bonded to each other to form a ring of 1–5 carbon atoms. Specific examples of the thiuram disulfide include tetramethylthiuram disulfide, tetraethylthiuram disulfide, tetrabutylthiuram disulfide and dipentamethylenethiuram disulfide. Of these, tetraethylthiuram disulfide is particularly preferable.

Component (d-3)

The component (d-3) is at least one hydrocarbon compound selected from the group consisting of hydrocarbon compounds having an aromatic ring and at least one saturated carbon atom (hereinafter referred to as "specific carbon atom 1") directly bonded to the ring, said carbon atom having bonded thereto at least one hydrogen atom and forming an aliphatic ring, and alicyclic hydrocarbon compounds having in the ring at least two carbon-to-carbon double bonds and at least one saturated carbon atom (hereinafter referred to as "specific carbon atom 2") adjacent to the carbon-to-carbon double bonds and forming the aliphatic ring, said carbon atom having at least one hydrogen atom.

The component (d-3) specifically includes, for example, (A) condensed polycyclic hydrocarbon compounds consisting of at least one aromatic ring and at least one aliphatic ring selected from five-membered rings and six-membered rings, (B) five-membered or six-membered single ring alicyclic hydrocarbon compounds having two unsaturated double bonds in the ring, and (C) alicyclic hydrocarbon compounds consisting of two aliphatic rings selected from five-membered rings and six-membered rings and having three unsaturated double bonds in the aliphatic rings.

Preferable examples of the compounds (A) include 9,10-dihydroanthracene, 1,4-dihydronaphthalene, 1,2-dihydronaphthalene, 1,2,3,4-tetrahydronaphthalene and indene; preferable examples of the compounds (B) include 1,4-cyclohexadiene and 1,4-cyclopentadiene; and preferable examples of the compounds (C) include 1,4,5,8-tetrahydronaphthalene.

Of these compounds (A) to (C), there are preferred those compounds wherein one of the specific carbon atom 1 and the specific carbon atom 2 is directly bonded to the two carbon-to-carbon double bonds. Such compounds are, for example, 9,10-dihydroanthracene, 1,4-dihydronaphthalene, indene and 1,4,5,8-tetrahydronaphthalene.

The above specific unsaturated cyclic compounds may be substituted with alkyl groups of 1–10 carbon atoms, preferably 1–4 carbon atoms, such as methyl, ethyl, butyl and the like.

As the component (d-3), there may also be used 3-phenylcyclohexene, etc., besides the compounds (A) to (c).

Component (d-4)

The component (d-4) is an unsaturated heterocyclic compound having in the heterocyclic ring a carbon-to-carbon double bond and at least one saturated carbon atom adjacent to the carbon-to-carbon double bond and forming the heterocyclic ring, said carbon atom having at least one hydrogen atom.

The component (d-4) ordinarily has 4–20 carbon atoms and includes, for example, 2,5-dihydrofuran, α-pyran, γ-pyran, 3,6-dihydro-2H-pyran, 2H-chromene, 4H-chromene, xanthene, phthalan and 3H-indole.

Of these, there are preferred those compounds wherein one of the specific carbon atoms is directly bonded to the two carbon-to-carbon double bonds. Such compounds include, for example, 4H-chromene and xanthene.

The above compounds may be substituted with alkyl groups of 1–10 carbon atoms, preferably 1–4 carbon atoms, such as methyl, ethyl, butyl and the like.

Component (d-5)

The component (d-5) is a hydrocarbon compound having at least two unsaturated bonds and at least one saturated carbon atom adjacent to the carbon atoms taking part in the two unsaturated bonds, said saturated carbon atom forming no ring structure and having at least one hydrogen atom.

The component (d-5) ordinarily has 5–20 carbon atoms and includes compounds having a structural unit represented by the following general formula (II) and compounds having a structural unit represented by the following general formula (III):

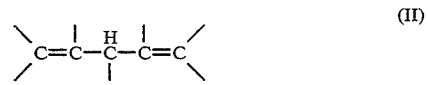

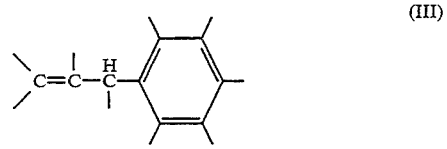

Specific example of the compounds having a structural unit represented by the general formula (II) is 1,4-hexadiene, and specific examples of the compounds having a structural unit represented by the general formula (III) are 3-phenyl-1-pentene, 1-phenyl-2-pentene, 1-phenyl-2-hexene and 2-phenyl-3-hexene.

The above compounds may be substituted with alkyl groups of 1-10 carbon atoms, preferably 1-4 carbon atoms, such as methyl, ethyl, butyl and the like.

Component (d-6)

The component (d-6) is a mixture consisting of (X) at least one compound [hereinafter referred to as component (X)] selected from the group consisting of terpinolene, α-terpinene, γ-terpinene and dipentene and (Y) at least one compound [hereinafter referred to as component (Y)] selected from the group consisting of alkylmercaptans, carbon tetrachloride, xanthogen disulfides and thiuram disulfides.

Specific examples of the alkylmercaptans as the component (Y) include octylmercaptan, n-dodecylmercaptan, tert-dodecylmercaptan, n-tetradecylmercaptan, tert-tetradecylmercaptan and n-hexadecylmercaptan. Of these, tert-dodecylmercaptan is used preferably.

The xanthogen disulfides and thiuram disulfides include the same disulfide compounds as mentioned for the component (d-2).

The proportion of the component (X) in the component (d-6) is 5-95% by weight, preferably 10-95% by weight. When the proportion of the component (X) is less than 5% by weight or more than 95% by weight, no meritorious effect is obtained by the combination use of the components (X) and (Y).

The components (d-1) to (d-6) can be used alone or in combination of two or more.

In this invention, the component (d) is preferably an α-methylstyrene dimer which is the component (d-1), because it gives a low coagula content and weakest odor. The component (d-1) is preferably used in combination with chain transfer agents other than the component (d-1). The chain transfer agents other than the component (d-1) are preferably alkylmercaptans, halogenated hydrocarbons, disulfide compounds, etc. and particularly preferably alkylmercaptans. As the alkylmercaptans, halogenated hydrocarbons and disulfide compounds, there can be mentioned the same compounds as mentioned above. In this case, the proportion of the component (d-1) in the total chain transfer agents is ordinarily 2-100% by weight, preferably 3-100% by weight, more preferably 5-100% by weight, most preferably 5-95% by weight. When the component (d-1) is used in a proportion of 2% by weight or more based on the total chain transfer agents, bonding strength and blister resistance can be further increased.

The proportion of the component (d) is 0.05-20 parts by weight, preferably 0.1-10 parts by weight, more preferably 0.5-7 parts by weight per 100 parts by weight of the total monomers, i.e. the total of the components (a), (b) and (c).

When the amount of the component (d) used is less than 0.05 part by weight, blister resistance is poor. When the amount is more than 20 parts by weight, a large amount of coagula is formed during the emulsion polymerization, making the production of copolymer latex virtually impossible.

(Polymerization process and additives used in polymerization)

The copolymer latex of this invention can be produced by a conventional emulsion polymerization process using the above-mentioned monomers and chain transfer agent. That is, the present copolymer latex can be obtained by adding, to an aqueous medium (usually water), a monomer mixture, a polymerization initiator, an emulsifier, a chain transfer agent, etc. and subjecting the resulting mixture to emulsion polymerization.

In this invention, the polymerization initiator used in emulsion polymerization is not critical, and there can be used, for example, organic polymerization initiators such as hydroperoxides (e.g. cumene hydroperoxide, diisopropylbenzene hydroperoxide, paramenthane hydroperoxide), peroxides (e.g. benzoyl peroxide, lauroyl peroxide), azo compounds (e.g. azobisisobutyronitrile) and the like, as well as inorganic polymerization initiators such as persulfates (e.g. potassium persulfate, sodium persulfate, ammonium persulfate) and the like.

In this invention, these organic polymerization initiators may be used alone; however, the combined use of the above organic polymerization initiator and the above inorganic polymerization initiator is preferable because it gives a copolymer latex of higher mechanical stability and lower content of fine coagula formed during polymerization.

The above polymerization initiators can be used also in the form of redox type polymerization initiator which is a combination of one of the above polymerization initiator and a reducing agent such as sodium bisulfite or the like.

Of these polymerization initiators, preferable are persulfates such as potassium persulfate, ammonium persulfate and the like; combinations of a persulfate and azobisisobutyronitrile or benzoyl peroxide; and combinations of a persulfate, azobisisobutyronitrile or benzoyl peroxide, and a reducing agent.

In this invention, the amount of the polymerization initiator used is usually 0.1-5 parts by weight, preferably 0.5-2 parts by weight, per 100 parts by weight of the total monomers. When an inorganic polymerization initiator and an organic polymerization initiator are used in combination, the proportion of the organic polymerization initiator is preferably 70% by weight or less, more preferably 50% by weight or less, based on the total polymerization initiators. When the proportion of the organic polymerization initiator is more than 70% by weight, there arise the same problems as when an organic polymerization initiator is used alone.

The type of the emulsifier used in the present emulsion polymerization is not critical, and there can be used any of anionic, nonionic and amphoteric surface active agents. These can be used alone or in admixture of two or more. There can be used, for example, anionic surface active agents such as salt of higher alcohol sulfate (e.g. sodium lauryl sulfate), salt of alkylbenzenesulfonic acid (e.g. sodium dodecylbenzenesulfonate) and sulfonic acid salt of aliphatic carboxylic acid ester (e.g. sodium dioctylsulfosuccinate), as well as nonionic surface active agents such as alkyl ester, alkyl phenyl ether and alkyl ether of polyethylene glycol. The amphoteric surface active agents include those having, as the anionic portion, a carboxylic acid salt, a sulfuric acid ester salt, a sulfonic acid salt, a phosphoric acid salt or a phosphoric acid ester salt and, as the cationic portion, an amine salt or a quaternary ammonium salt. Specifically, there can be mentioned, as alkylbetaine salts, salts of laurylbetaine, stearylbetaine, and 2-undecylhydroxyethylimidazolium betaine and, as amino acid type salts, salts of lauryl-β-alanine, stearyl-β-alanine, lauryldi(aminoethyl)glycine, octyl-di(aminoethyl)glycine and dioctyl-di(aminoethyl)glycine.

Of these emulsifiers, salts of alkylbenzenesulfonic acids are preferable, and sodium dodecylbenzenesulfonate is particularly preferable. The salts of alkylbenzenesulfonic acids may be used in combination with other surface active agents, for example, anionic surface active agents (e.g. salt of higher alcohol sulfate, sulfonic acid salt of aliphatic carboxylic acid ester) and nonionic surface active agents (e.g. alkyl ester, alkyl ether and alkyl phenyl ether of polyethylene glycol).

The amount of the emulsifier used is usually 0.05-2 parts by weight, preferably 0.05-1 part by weight, per 100 parts by weight of the total monomers. When a salt of an alkylbenzenesulfonic acid is used in combination with other surface active agent of anionic type or nonionic type, the proportion of the former is preferably 50% by weight or more based on the total emulsifers.

In this invention, the emulsion polymerization process and other conditions are not critical, and emulsion polymerization can be effected by a conventionally known process under conventionally known conditions.

For example, the chain transfer agent can be added in one portion, in portions, continuously or in combination thereof.

The monomer mixture can be added in one portion, in portions, continuously or in combination thereof. Of these additions, addition in portions or continuous addition is preferable in view of the low content of fine coagula formed during polymerization, removal of the heat generated, etc. When the emulsion polymerization is conducted in two stages, that is, 10-50% by weight of the monomer mixture containing the whole or part of an ethylenically unsaturated carboxylic acid monomer is polymerized in the first stage and, in the second stage, the balance (50-90% by weight) of the monomer mixture is continuously added and polymerized, the formation of coagula during the polymerization can be reduced and there can be obtained a paper coating composition of superior properties. Therefore, it is preferable to conduct the emulsion polymerization of this invention in two stages. In this case, the chain transfer agent can be added in the first stage, the second stage or both. When the chain transfer agent is added in the second stage, the agent is preferably added continuously.

There may be used the so-called seed polymerization wherein the above-mentioned monomers of this invention are polymerized in the presence of a seed latex and the chain transfer agent of this invention. The monomer composition for the seed latex preferably comprises 0.1-10% by weight of the above-mentioned monomer component (b), 50-99.9% by weight, preferably 50-99.4% by weight of the above-mentioned monomer component (a) and/or (c), and 0-40% by weight, preferably 0.5-40% by weight of an ethylenically unsaturated crosslinking monomer.

The amount of the seed latex used is preferably 0.05-20 parts by weight (solid content) per 100 parts by weight of the monomers to be polymerized in the presence of the seed latex. When the copolymer latex of this invention is produced by seed polymerization, the meritorious effects intended by this invention can be enhanced.

The ethylenically unsaturated crosslinking monomer is preferably divinylbenzene, ethylene glycol dimethacrylate or trimethylolpropane trimethacrylate, more preferably divinylbenzene.

In this invention, preferably 10% by weight or more of the monomers and preferably 5% by weight or more of the chain transfer agent are continuously added in the first stage and/or the second stage. In this case, it is preferable that emulsion polymerization be effected while the weight ratio per unit time of the monomers added continuously and the chain transfer agent added continuously be changed continuously.

That is, in the first stage, the second stage or both, there can be preferably adopted addition methods as shown in FIGS. 1 to 4.

In FIGS. 1 to 4, the abscissa axis indicates the time elapsing from the start of each polymerization stage, and the ordinate axis indicates the weight ratio ($\gamma$) per unit time of the chain transfer agent added, to the monomers added.

In the method shown in FIG. 1, the chain transfer agent and the monomers are added at a constant weight ratio, i.e. a constant $\gamma$ during the initial period (B) of the stage; during the intermediate period (A) of the stage, the chain transfer agent and the monomers are added so as to give a linearly increasing $\gamma$, that is, a linearly increasing weight ratio of chain transfer agent to monomers; and during the last period (C) of the stage, a constant $\gamma$ is employed again as in the initial period (B).

In the method shown in FIG. 2, a constant $\gamma$ is employed during the initial period (B) and the last period (C) of the stage; during the intermediate period (A), a linearly decreasing $\gamma$ is employed, that is, the weight ratio of chain transfer agent to monomers is linearly decreased.

In the method of FIG. 3, during the intermediate period (A), the amount of the chain transfer agent added is changed so as to give a linearly increasing $\gamma$ and then a linearly decreasing $\gamma$. In the method of FIG. 4, during the intermediate period (A), the amount of the chain transfer agent added is changed so as to give a linearly decreasing $\gamma$ and then a linearly increasing $\gamma$.

FIGS. 1 to 4 shows the methods of addition of the monomers and the chain transfer agent. However, the addition methods are not restricted to them and the following cases are also considered.

(1) The change of $\gamma$ can be not only linear but also like a curve.
(2) During the initial period (B) and/or the last period (C) of the stage, the addition of the monomers and chain transfer agent need not always be continuous and may be any of addition in one portion, addition in portions, etc.
(3) Either or both of the initial period (B) and the last period (C) may be eliminated.
(4) In the middle of the period of changing $\gamma$, there may be adopted a period of constant $\gamma$ similar to the initial period (B) or the last period (C).

Thus, by continuously changing the weight ratio ($\gamma$) of chain transfer agent to monomers, bonding strength and blister resistance can be improved further. Specifically, the use of the addition method shown in FIG. 1 can give further improved bonding strength, and the use of the addition method shown in FIG. 2 can give further improved blister resistance.

The copolymer latex obtained by the present process has a gel content of 5% or more, preferably 10-98%, more preferably 30-85%. When the gel content is less than 5%, bonding strength and mechanical strength are very low. When the gel content is more than 98%, bonding strength tends to be low.

In this invention, polymerization conversion is 90% by weight or more, preferably 95% by weight or more. (Applications of invention, additives, etc.)

The copolymer latex obtained in this invention can be used in various applications requiring adhesion. The copolymer latex can be used effectively in, for example, paper coating compositions for various printing papers (e.g. gravure printing paper, offset printing paper, letterpress printing paper, flexographic printing paper); paper coating compositions for paper board, cast-coated paper, thermosensitive paper, pressure-sensitive paper, ink jet recording paper, etc.; paper coating compositions for other papers; carpet packing compositions; adhesives or adhesive compositions; paints; surface coating agents for organic materials, inorganic materials and metal materials; modifiers for bituminous substances (e.g. asphalt) and cement; and foam rubber.

One type of paper coating composition of this invention comprises ordinarily 100 parts by weight of a pigment and, as a binder, ordinarily 3–30 parts by weight (solid content) of the above-mentioned copolymer latex (this paper coating composition is hereinafter referred to as paper coating composition A). This paper coating composition A can well withstand severe conditions employed in the production step or printing step of coated paper for obtaining higher productivity and higher quality, and enables production of a coated paper with excellent bonding strength and blister resistance.

The above pigment includes inorganic pigments such as kaolin clay, talc, barium sulfate, titanium oxide (rutile, anatase), calcium carbonate, aluminum hydroxide, zinc oxide, satin white and the like; and organic pigments such as polystyrene latex and the like. These pigments can be used alone or in admixture of two or more.

The copolymer latex as a binder can be used in combination with other binders such as natural binder (e.g. starch, oxidized starch, soybean protein, casein), polyvinyl alcohol and synthetic latex (e.g. polyvinyl acetate latex, acrylic polymer latex).

Into the paper coating composition A of this invention can be incorporated, as necessary, various auxiliaries ordinarily used, such as dispersant (e.g. sodium pyrophosphate, sodium hexametaphosphate), antifoaming agent (e.g. polyglycol, fatty acid ester, phosphoric acid ester, silicone oil), leveling agent (e.g. Turkey red oil, dicyandiamide, urea), antiseptic, agent for imparting water resistance (e.g. formalin, hexamine, melamine resin, urea resin, glyoxal), releasing agent (e.g. calcium stearate, paraffin emulsion), fluorescent dye, color retention improver (e.g. carboxymethyl cellulose, methyl cellulose, sodium alginate).

The paper coating composition A of this invention can be coated on a paper by a conventionally known method using, for example, an air knife coater, a blade coater, a roll coater or an applicator.

Another type of paper coating composition of this invention comprises ordinarily 5–20 parts by weight (solid content) of the above-mentioned specific latex III as a binder, 0.01–10 parts by weight of a water-soluble high-molecular weight compound, and 100 parts by weight of a pigment containing 30% by weight, preferably 50–90% by weight, of calcium carbonate so that the total solid content in composition is 60% by weight or more (this composition is hereinafter referred to as paper coating composition B). This paper coating composition B enables good coating in spite of its high solid content. The composition B can well withstand severe conditions employed in the production step or printing step of coated paper for obtaining higher productivity and higher quality, and enables production of a coated paper with excellent adhesion strength, excellent blister resistance and further improved gloss.

The water-soluble high-molecular weight compound includes, for example, denaturated starch such as oxidized starch and the like; and natural or synthetic water-soluble high-molecular weight compounds such as starch, casein, polyvinyl alcohol, sodium alginate, carboxymethyl cellulose, methyl cellulose, hydroxycellulose and the like. Of these, denaturated starch is particularly preferable. These water-soluble high-molecular weight compounds can be used alone or in combination of two or more.

The calcium carbonate is preferably calcium carbonate having an average particle diameter of 5 μm or less or soft calcium carbonate having an average particle diameter of 1 μm or less.

The descriptions of pigment, binder and other additives as to the paper coating composition A can also apply to the pigment, binder and other additives used in the paper coating composition B.

Still another type of paper coating composition of this invention comprising 3–30 parts by weight (solid content) of the specific latex I and 100 parts by weight of a pigment (this composition is hereinafter referred to as paper coating composition C) is superior in workability in high concentration coating, can well withstand severe conditions employed in the production step and printing step of coated paper for obtaining higher productivity and higher quality, enables production of a coated paper excellent in bonding strength, blister resistance, printing gloss, inking, glueability and blister pack property, and accordingly is useful as a paper coating composition for paper board or gate roll coating.

The descriptions of pigment, binder and other additives as to the paper coating composition A can also apply to the pigment, binder and other additives used in the paper coating composition C.

The applications of this invention include a carpet backing composition comprising ordinarily 100 parts by weight (solid content) of the copolymer latex of this invention and ordinarily 30–800 parts by weight, preferably 100–700 parts by weight of an inorganic filler.

This carpet backing composition can well withstand severe conditions employed in the production step of carpet for obtaining higher productivity, is very low in formation of blister, and can give a carpet superior in feeling and highly improved in peeling strength and tuft lock strength.

The inorganic filler includes calcium carbonate, aluminum hydroxide, magnesium hydroxide, clay, barium sulfate, silicic acid, silicate, titanium oxide, magnesium carbonate, calcium carbonate, etc. but is not restricted to these.

These inorganic fillers can be used alone or in combination of two or more.

Thus, the carpet backing composition of this invention comprises, as main components, the copolymer latex of this invention and an inorganic filler, and can further comprise, as necessary, a dispersant, an antifoaming agent, a crosslinking agent, a foaming agent, a coloring agent, a flame-retardant, an antiseptic, an oxidation inhibitor, a stabilizer, a vulcanization accelerator, an antistatic agent, a pH adjusting agent, etc.

The applications of this invention further include an adhesive composition comprising ordinarily 10–90% by weight (solid content), preferably 35–65% by weight (solid content) of the copolymer latex of this invention and 10–90% by weight, preferably 35–65% by weight of a thermoplastic polymer (this composition is hereinafter referred to as adhesive composition I).

The adhesive composition I can well withstand severe conditions employed in the coating step for enhancing the workability, is very low in viscosity change and formation of blister, is superior in coatability, has excellent bonding strength, and accordingly is useful as an adhesive for plywood, woodwork and various materials such as paper, corrugated board, cement, metal and the like.

The thermoplastic polymer includes a maleic anhydride/α-olefin copolymer, a polyvinyl chloride, a polyvinyl alcohol, an acrylic polymer, a thermoplastic polyurethane, etc. The maleic anhydride/α-olefin copolymer is particularly preferable.

The maleic anhydride/α-olefin copolymer is obtained by copolymerizing maleic anhydride with an α-olefin monomer copolymerizable therewith. The α-olefin monomer is preferably an α-olefin of 3–10 carbon atoms. The α-olefin of 3–10 carbon atoms includes isobutyrene, propylene, 1-butene, 1-pentene, 2-hexene, 4-methyl-1-pentene, 1-octene, 1-decene, styrene and their mixtures. Of these α-olefin monomers, styrene and isobutyrene are particularly preferable.

Into the adhesive composition I of this invention can be incorporated, as necessary, various additives such as pH adjusting agent, filler, viscosity adjusting agent, curing agent, oxidation inhibitor and the like. These additives include, for example, slaked lime, wood flour, wheat flour, casein, ammonium chloride and phenolic oxidation inhibitor. Slaked lime (pH adjusting agent and also filler) is used in a proportion of ordinarily 20–60 parts by weight per 100 parts by weight of the total of the copolymer latex (solid content) and the thermoplastic polymer; and ammonium chloride (curing agent) is used in a proportion of ordinarily 0.05–0.7 part by weight per 100 parts by weight of the total of the copolymer latex (solid content) and the thermoplastic polymer.

This invention provides another adhesive composition comprising ordinarily 10–90% by weight (solid content), preferably 35–65% by weight (solid content) of the copolymer latex of this invention and 10–90% by weight, preferably 35–65% by weight of a thermosetting resin (this composition is hereinafter referred to as adhesive composition II).

The adhesive composition II is very low in quality deterioration even under severe conditions employed in the coating step for enhancing workability, is improved in various properties such as prevention for staining by exudation, bonding strength, seasoning crack resistance and the like, and is useful as an adhesive for wooden materials, etc.

The thermosetting resin includes, for example, a melamine resin, a urea resin, a urea-melamine resin, a phenolic resin and an epoxy resin. A urea resin and a urea-melamine resin are particularly preferable. These resins can be used alone or in combination of two or more.

The adhesive composition II can comprise the same additives as used in the adhesive composition I. In this case, known curing agents such as ammonium chloride, chlorine and the like are used in a proportion of ordinarily 0.05–5 parts by weight per 100 parts by weight of the total of the copolymer latex and the thermosetting resin.

This invention is described more specifically below referring to Examples. In the Examples, % and parts are by weight, unless otherwise specified.

EXAMPLE 1

(Preparation of copolymer latex)

Into a 100-liter pressure vessel were fed, as shown in Table 1, 2 parts of itaconic acid, 1 part of acrylic acid, 10 parts of butadiene, 18 parts of styrene, 10 parts of methyl methacrylate and 5 parts of acrylonitrile as a monomer mixture of first stage. Then, there were fed 150 parts of water, 1.5 parts of an α-methylstyrene dimer, 0.3 part of sodium dodecylbenzenesulfonate and 1.0 part of potassium persulfate. Thereafter, polymerization was effected at 70° C. for 2 hours in a nitrogen atmosphere. Subsequently, there were added, as a monomer mixture of second stage, 15 parts of butadiene, 31 parts of styrene, 3 parts of acrylonitrile and 5 parts of methyl methacrylate, as well as 1.5 parts of an α-methylstyrene dimer, continuously in 8 hours to effect further polymerization. The reaction was continued for a further 3 hours and then completed at a conversion of 98%.

The resulting copolymer latex was adjusted to pH 7.5 with sodium hydroxide; steam was blown thereinto to remove the unreacted monomers; the resulting mixture was subjected to vacuum distillation under heating to obtain a copolymer latex [hereinafter referred to as copolymer latex (I-1)] having a solid content of 50%.

The α-methylstyrene dimer used above and to be used also in the following Examples and Comparative Examples had the following composition.

Trade name: Nofmer MSD, manufactured by NIPPON OIL & FATS CO., LTD.

| Composition: | |
| --- | --- |
| 2,4-Diphenyl-4-methyl-1-pentene | 92.0% by wt. or more |
| 2,4-Diphenyl-4-methyl-2-pentene | 5.0% by wt. or less |
| 1,1,3-Trimethyl-3-phenylindane | 1.5% by wt. or less |
| α-Methylstyrene | 1.0% by wt. or less |

The copolymer latex (I-1) was measured for gel content in accordance with the following method.

The copolymer latex was adjusted to pH 8.0, coagulated with isopropanol, washed, and dried. About 0.3 g of a sample was collected from the resulting coagulum, immersed in 100 ml of toluene for 20 hours, and measured for toluene insoluble. The toluene insoluble content was converted to a proportion (%) to the sample to use it as a gel content.

The copolymer latex was also measured for content of fine coagula formed during the polymerization, in accordance with the following method.

1 kg of the copolymer latex was collected as a sample. The sample was filtered through a 400-mesh wire net, and the amount of the fine coagula remaining on the net was weighed and converted to a proportion to the sample (expressed as solid content) to obtain a content of fine coagula. The fine coagula content was evaluated in accordance with the following three-grade method.

○: less than 0.05% (small amount)

Δ: 0.05–0.1% (relatively large amount)
X: more than 0.1% (considerably large amount)
(Preparation of paper coating composition)

A paper coating composition (a color) was prepared from the copolymer latex (I-1), using the following recipe.

| Clay | 80 parts |
| Calcium carbonate | 20 parts |
| Copolymer latex (I-1) | 10 parts |
| Oxidized starch | 5 parts |
| Sodium pyrophosphate | 0.5 part |
| Water | To make the total solid content to 60%. |

The color was evaluated in accordance with the following test methods. Incidentally, the coated paper used in the tests was obtained by coating the color on a base paper of 64 g/m² with a coating blade so that the amount of the color coated became 20 g/m².

(1) Dry pick resistance (yardstick for bonding strength)

The degree of pick when a coated paper was subjected to printing by a RI printability tester was examined visually and evaluated in accordance with a five-grade method. A higher point indicates a better result. The point is an average of six measurements.

(2) Blister resistance

A double side coated printing paper was adjusted to a moisture of about 6%, and then placed in a heated oil bath. Thus, there was measured a lowest temperature at which the paper caused blister.

(3) Mechanical stability

The color was adjusted to a solid content of 20% by weight and then subjected to mechanical shear by kneading between rubber rolls using a gum up tester at a pressure of 10 kg at 100 rpm at 60° C. Thus, there was measured a time (minutes) up to the first appearance of coagula on the rolls. The mechanical stability of the color was evaluated in accordance with the following three-grade method.

○: 30 minutes or more
Δ: 20 minutes or more to less than 30 minutes
X: Less than 20 minutes The results are shown in Table 2.

EXAMPLES 2 TO 10

The same procedure as in Example 1 was repeated, except that the monomer mixture, chain transfer agent, polymerization initiator and emulsifier used in Example 1 were changed to those shown in Table 1, to obtain copolymer latexes [hereinafter referred to as copolymer latexes (I-2) to (I-10)]. The polymerization time in Example 10 was different from that in Example 1; that is, in Example 10, the first stage polymerization was effected for 6 hours and the second stage polymerization was effected for 2 hours to obtain a copolymer latex (I-10). In all of Examples 2–10, polymerization was completed at a conversion of 98%.

Paper coating compositions were prepared from these copolymer latexes in the same manner as in Example 1 and evaluated for properties.

The results are shown in Table 2.

EXAMPLE 11

The same procedure as in Example 1 was repeated, except that the second stage polymerization was effected with the weight ratio of chain transfer agent added to monomer mixture added being continuously decreased from $\gamma_0 = 0.05$ (the start of addition) to $\gamma_F = 0.0056$ (the end of addition), to obtain a copolymer latex [hereinafter referred to as copolymer latex (I-11)]. The polymerization was completed at a conversion of 98%.

EXAMPLE 12

The same procedure as in Example 10 was repeated, except that the first stage polymerization was effected for 6 hours with the weight ratio of chain transfer agents added to monomer mixture added being continuously increased from $\gamma_0 = 0.01$ (the start of addition) to $\gamma_F = 0.0522$ (the end of addition), to obtain a copolymer latex [hereinafter referred to as copolymer latex (I-12)]. The polymerization was completed at a conversion of 98%.

The copolymer latexes (I-11) and (I-12) were measured for gel content by the same methods as in Example 1. Paper coating compositions were prepared from these latexes in the same manner as in Example 1 and evaluated for physical properties by the same methods as in Example 1. The results are shown in Table 2.

EXAMPLES 13 AND 14

Into a 100-liter pressure vessel were fed 150 parts of water and the first stage monomer mixture, chain transfer agent(s), polymerization initiator and emulsifier of the types and amounts shown in Table 2. The mixture was polymerized at 70° C. for 2 hours in a nitrogen atmosphere. Then, the second stage monomer mixture other than ethylenically unsaturated amine monomer, shown in Table 2 was continuously added in 8 hours at 70° C. to effect polymerization. Thereafter, the polymerization system was adjusted to pH 7.5 with ammonia water, after which the ethylenically unsaturated amine monomer was added and polymerization was effected for a further 3 hours. The polymerization was completed at a conversion of 98%. In the same manner, there were obtained two copolymer latexes [hereinafter referred to as copolymer latexes (I-13) and (I-14)].

Paper coating compositions were prepared from these latexes in the same manner as in Example 1, and evaluated for the same test items by the same methods as in Example 1 and also for water resistance in accordance with the following method. The results shown in Table 3 were obtained.

Test method for water resistance Wet pick resistance (yardstick for water resistance)

The degree of pick when a coated paper was subjected to printing by a RI printability tester using a molton roller to feed dampening water was examined visually and evaluated in accordance with a five-grade method. A higher point indicates a better result. The point is an average of six measurements.

EXAMPLE 15

(1) Preparation of seed latex
(Seed latex A)

Into a 100-liter pressure vessel were fed 4 parts of acrylic acid, 76 parts of styrene, 20 parts of divinylbenzene, 30 parts of sodium dodecylbenzenesulfonate and 1.5 parts of potassium persulfate. The mixture was polymerized at 80° C. for 2 hours in a nitrogen atmosphere. As a result, a seed latex falling in the scope of this invention was obtained at a conversion of higher than 99%. This latex is hereinafter referred to as seed latex A.

(Seed latexes B and C)

The same procedure as in the case of seed latex A was repeated, except that the polymerization materials and conditions shown in Table 4 were used, to obtain two seed latexes B and C both falling in the scope of this invention.

(2) Preparation of copolymer latex by seed polymerization

Into a 100-liter pressure vessel were fed 1 part of the seed latex A, 3 parts of itaconic acid, 1 part of acrylic acid, 22 parts of butadiene, 48 parts of styrene, 10 parts of methyl methacrylate, 5 parts of acrylonitrile, 1.5 parts of an α-methylstyrene dimer, 0.1 part of sodium dodecylbenzenesulfonate, 200 parts of water and 0.8 part of potassium persulfate. The mixture was polymerized at 60° C. for 5 hours in a nitrogen atmosphere (1st stage polymerization). In this polymerization, 0.15 part (besides the above 0.1 part) of sodium dodecylbenzenesulfonate was added in two portions at the second and fourth hours from the start of polymerization.

Then, 6 parts of butadiene, 2 parts of styrene and 3 parts of methyl methacrylate were added continuously in 2 hours to effect polymerization (second stage polymerization). Polymerization was continued for a further 4 hours (aging) to complete the reaction at a conversion of 99%.

The resulting copolymer latex was adjusted to pH 7 with sodium hydroxide. Steam was blown thereinto to remove the unreacted monomers, and the resulting mixture was subjected to vacuum distillation under heating to adjust the solid content of copolymer latex to 50%. Thus, a copolymer latex was obtained.

Using the copolymer latex, there was prepared a paper coating composition in the same manner as in Example 1. The paper coating composition was evaluated by the same methods as in Example 13 and also in accordance with the following test methods for wet rub and calender roll staining resistance, to obtain the evaluation results shown in Table 6.

Wet rub (yardstick for water resistance and roll staining resistance)

A sample was subjected to an Adams tester for 15 seconds and the resulting cloudy water was measured for transmittance by a spectrophotometer. A larger value indicates a better result.

Calendar roll staining resistance

A coated paper not subjected to super calendering is placed on a block paper so that the coated side of the former contacts the latter; they are passed through a super calender 10 times at 50° C. at 250 kg/cm²; then, the degree of pick of the coated paper is evaluated by examining the staining of the block paper. Less staining indicates higher resistance for calender roll staining.

Evaluation standard
◎: No staining is seen.
○: Very slight staining is seen.
Δ: Slight staining is seen.
×: Considerable staining is seen.

EXAMPLE 16 AND 17

The same procedure as in Example 15 was repeated, except that the polymerization materials and conditions shown in Table 5 were used, to obtain copolymer latexes.

Paper coating compositions were prepared from the copolymer latexes in the same manner as in Example 1, and evaluated by the same methods as in Example 15 to obtain the results shown in Table 6.

EXAMPLES 18–22

(Preparation of copolymer latexes)

Into a pressure reactor were fed 80 parts of water, 2 parts of sodium dodecylbenzenesulfonate, 1.5 parts of potassium persulfate, 20% of the monomers shown in Table 6 and 20% of the chain transfer agent(s) shown in Table 6. The mixture was reacted at 80° C. for 3 hours. Then, a mixture of the remaining portions of the monomers and the chain transfer agent(s) was added continuously in 5 hours at 80° C. to effect a reaction. The reaction was continued for a further 5 hours at 80° C. to complete polymerization to obtain 5 copolymer latexes [hereinafter referred to as copolymer latexes (I-18) to (I-22)] falling in the scope of this invention.

(Preparation of compositions)

There were mixed 55 parts (solid content) of one of the copolymer latexes (I-18) to (I-22) shown in Table 7, 45 parts of a resin mixture comprising a urea resin and a urea-melamine resin at a ratio (%) of 90:10, 30 parts of a wheat flour and 20 parts of water. Thereinto was blended 0.5 part of ammonium chloride to obtain 5 thermosetting resin compositions. These thermosetting resin compositions were measured for physical properties in accordance with the following test methods, to obtain the results shown in Table 8.

(I) Preparation of test samples

Each of the thermosetting resin compositions was coated on a 3-ply lauan plywood of 4 mm in thickness in an amount shown below and specified by each of the following tests; on the coated composition was placed, within 5 minutes, a slice veneer of 0.3 mm in thickness; they were subjected to stacking for 10 minutes; then, they were tightened at a pressure of 5 kg/cm² at 110° C. for 60 seconds; thereafter, they were aged for 20 hours at room temperature to obtain a decorative plywood having a slice veneer on one side. The plywood was cut in dimensions specified by Japanese Agriculture Standard to obtain test pieces.

Amount coated
10 g/900 cm² and 15 g/900 cm² for test for
prevention of staining by exudation and type
two soak delamination test
12 g/900 cm² for cold-hot cycle test (II) Test items (1) Test for prevention of staining by exudation The surface of the slice veneer side of a test piece was visually inspected to evaluate the degree of exudation of the thermosetting resin composition on the surface. The evaluation standard used is as follows.
○: No exudation is seen.
Δ: Slight exudation is seen.
×: Considerable exudation is seen.

(2) Test for seasoning crack resistance (cold-hot cycle test)

This test was conducted in accordance with a JAS (Japanese Agriculture Standard) specified for ordinary plywood. That is, a test piece of 15 cm×15 cm was fixed by a metal frame at the four sides, then allowed to stand for 2 hours in a container of 80°±3° C. and thereafter allowed to stand for 2 hours in a container of −20°±3° C. The surface of the resulting test piece was visually inspected to evaluate the degree of seasoning crack on the surface. The evaluation standard used is as follows.
○: No seasoning crack is seen.
Δ: Slight seasoning crack is seen.
×: Considerable seasoning crack is seen.

(3) Test for bonding strength

This test was conducted in accordance with the following methods specified by a JAS for ordinary plywood.
  (a) Test for bonding strength in normal state
  (b) Type one soak delamination test (boiling water)
  (c) Type two soak delamination test (hot water of 70° C.)

Each of the above tests (a), (b) and (c) was conducted using a tensile tester for plywood, manufactured by Toyo Shikenki, at a peeling speed of 50 mm/min.

In the above tests (a) to (c), wood failure was also examined. Wood failure refers to such a condition that during the measurement of adhesion, peeling takes place with the chips of the adhered (the slice veneer) remaining on the peeling interface. The value of wood failure is expressed as a ratio (%) of wood failure area to adhesion area. A larger wood failure indicates a higher adhesion.

EXAMPLES 23 TO 27

55 parts of an isobutyrene-maleic anhydride copolymer (KURARE ISOBAM 06 manufactured by KURARAY CO., LTD.), 1.0 part of sodium hydroxide and 65 parts of water were mixed and then heated at 65° C. to obtain a solution. To this solution were added 100 parts of slaked lime and 45 parts of water in this order, and the mixture was stirred. The mixture was mixed with 45 parts (solid content) of one of the copolymer latexes (I-18) to (I-22) prepared in Examples 18 to 22, and 0.3 part of ammonium chloride to obtain 5 thermoplastic polymer compositions. The thermoplastic polymer compositions were tested for coatability in accordance with the following test method and also for bonding strength by the same method as in Example 18. The results are shown in Table 9. Coatability (tent method)

In accordance with the test method for viscosity change with time, 500 g of a thermoplastic polymer composition is charged into a spreader, wherein the composition is rotated at a given speed to measure its viscosity change with time and workability. The evaluation standard used is as follows.

◯: Coating by spreader is smooth and coatability is good.

✕: Coating by spreader is not smooth and coatability is poor.

EXAMPLES 28–61 AND COMPARATIVE EXAMPLES 1–4

(Preparation of copolymer latexes)

Into a 100-liter pressure reactor was fed 150 parts of water, followed by feeding the first stage materials [monomers, chain transfer agent(s), polymerization initiator(s) and emulsifier(s)] shown in Tables 10, 11, 13, 15, 17 and 19. The mixture was polymerized at 70° C. for 2 hours in a nitrogen atmosphere.

Then, the second stage monomers and chain transfer agent(s) were continuously added in 8 hours to effect polymerization. The second stage emulsifier(s) was (were) added in one portion at the fifth hour from the start of the second stage addition. The reaction was continued for a further 3 hours to complete polymerization. The polymerization was completed when the conversion reached about 98%.

Each of the resulting copolymer latexes was adjusted to pH 7.5 with sodium hydroxide; steam was blown thereinto to remove the unreacted monomers; the resulting mixture was subjected to vacuum distillation under heating to adjust the solid content to 50% to obtain copolymer latexes (Nos. of these copolymer latexes are shown in Tables 10, 11, 13, 15, 17 and 19).

The copolymer latexes were measured for fine coagula content and gel content by the same methods as in Example 1. The results are shown in Tables 10, 12, 14, 16, 18 and 19.

(Preparation of paper coating compositions)

Paper coating compositions (coatings) were prepared from the above copolymer latexes in the same manner as in Example 1.

The coatings were evaluated by the same methods as in Example 1. The results are shown in Tables 10, 12, 14, 16, 18 and 19.

EXAMPLES 62–67 AND COMPARATIVE EXAMPLE 5

The procedure of Example 1 was repeated, except that there were used the monomer mixture, chain transfer agents, polymerization initiator and emulsifier shown in Table 20, to obtain copolymer latexes. In all the copolymer latexes, polymerization was completed at a conversion of 98%.

Paper coating compositions were prepared from the copolymer latexes in the same manner as in Example 1, and evaluated for properties.

The results are shown in Table 20.

In Table 20, fine coagula is indicated by %, wet pick resistance was measured by the same method as in Example 13; and odor was evaluated using an evaluation standard consisting of (◯) (no problem in practical use) and (Δ) (slight odor).

TABLE 1

| Copolymer latex No. | Example 1 (I-1) | Example 2 (I-2) | Example 3 (I-3) | Example 4 (I-4) |
|---|---|---|---|---|
| Monomers (parts in 1st/2nd stages) | | | | |
| Butadiene | 10/15 | 12/40 | 12/40 | 10/25 |
| Styrene | 18/31 | 15/10 | 13/15 | 23/23 |
| Methyl methacrylate | 10/5 | 8/2 | 3/8 | 10/5 |
| Acrylonitrile | 5/3 | 7/3 | 3/0 | — |
| Acrylamide | — | 0/2 | — | — |
| 2-Hydroxyethyl acrylate | — | — | 1/1 | — |
| Itaconic acid | 2/0 | 0/1 | 1/1 | 2/0 |
| Fumaric acid | — | — | — | — |
| Acrylic acid | 1/0 | — | 0/2 | 1/1 |
| Chain transfer agents (parts in 1st/2nd stages) | | | | |
| α-Methylstyrene dimer | 1.5/1.5 | 0.1/0.05 | 0.5/0 | 1.0/1.0 |
| Carbon tetrachloride | — | 3/0 | — | — |
| tert-Dodecylmercaptan | — | — | 1.5/1.5 | — |
| Tetraethylthiuram disulfide | — | — | — | 0.1/0.1 |
| Diethylxanthogen disulfide | — | — | — | — |
| Polymerization initiators (parts in 1st/2nd stages) | | | | |
| Potassium persulfate | 1.0/0 | — | 1.5/0 | 1.0/0 |
| Sodium persulfate | — | 0.4/0.4 | — | — |
| Azobisisobutyronitrile | — | — | — | — |
| Paramenthane hydroperoxide | — | — | — | — |
| Sodium formaldehyde sulfoxylate | — | — | — | — |
| Ferrous sulfate | — | — | — | — |
| Emulsifiers (parts in 1st/2nd stages) | | | | |
| Sodium dodecylbenzenesulfonate | 0.3/0.2 | 0.3/0.2 | 0.2/0.2 | 0.3/0.2 |
| Polyoxyethylene nonyl phenyl ether | — | — | 0/0.1 | — |

TABLE 1-continued

| Copolymer latex No. | Example 5 (I-5) | Example 6 (I-6) | Example 7 (I-7) | Example 8 (I-8) |
|---|---|---|---|---|
| Monomers (parts in 1st/2nd stages) | | | | |
| Butadiene | 8/22 | 10/25 | 10/25 | 8/22 |
| Styrene | 10/44 | 18/28 | 18/20 | 10/43 |
| Methyl methacrylate | 5/5 | 10/5 | 10/5 | 5/5 |
| Acrylonitrile | 0/3 | — | 5/3 | 1.5/1.5 |
| Acrylamide | — | 1.0/0 | — | — |
| 2-Hydroxyethyl acrylate | — | — | — | — |
| Itaconic acid | 2/0 | 1/0 | 1/1 | 0.5/1.5 |
| Fumaric acid | — | — | — | — |
| Acrylic acid | 1/0 | 2/0 | 1/1 | 1/1 |
| Chain transfer agents (parts in 1st/2nd stages) | | | | |
| α-Methylstyrene dimer | 1.5/0 | 0.15/0.15 | 1.0/1.0 | 4.0/0 |
| Carbon tetrachloride | — | — | — | — |
| tert-Dodecylmercaptan | — | 0.1/0.1 | — | — |
| Tetraethylthiuram disulfide | — | — | 1.5/1.5 | — |
| Diethylxanthogen disulfide | 0.5/0 | — | — | — |
| Polymerization initiators (parts in 1st/2nd stages) | | | | |
| Potassium persulfate | 0/0.8 | 1.0/0 | 1.0/0 | 0/0.8 |
| Sodium persulfate | — | — | — | — |
| Azobisisobutyronitrile | 1.0/0 | — | — | 1/0 |
| Paramenthane hydroperoxide | — | — | — | — |
| Sodium formaldehyde sulfoxylate | — | — | — | — |
| Ferrous sulfate | — | — | — | — |
| Emulsifiers (parts in 1st/2nd stages) | | | | |
| Sodium dodecylbenzenesulfonate | 0.2/0.1 | 0.3/0.2 | 0.3/0.2 | 0.3/0.2 |
| Polyoxyethylene nonyl phenyl ether | — | — | — | — |

| Copolymer latex No. | Example 9 (I-9) | Example 10 (I-10) | Example 11 (I-11) | Example 12 (I-12) |
|---|---|---|---|---|
| Monomers (parts in 1st/2nd stages) | | | | |
| Butadiene | 12/18 | 28/5 | 15/51 | 28/5 |
| Styrene | 15/22 | 35/2 | 18/31 | 35/2 |
| Methyl methacrylate | 13/13 | 15/3 | 10/5 | 15/3 |
| Acrylonitrile | 1.5/1.5 | 8/0 | 5/3 | 8/0 |
| Acrylamide | — | — | — | — |
| 2-Hydroxyethyl acrylate | — | — | — | — |
| Itaconic acid | — | 3/0 | 2/0 | 3/0 |
| Fumaric acid | 2/0 | — | — | — |
| Acrylic acid | 1/1 | 1/0 | 1/0 | 1/0 |
| Chain transfer agents (parts in 1st/2nd stages) | | | | |
| α-Methylstyrene dimer | 1.5/0 | 2/0 | 1.5/1.5 | 2/0 |
| Carbon tetrachloride | — | — | — | — |
| tert-Dodecylmercaptan | 0.5/1.5 | 0.8/0.1 | — | 0.8/0.1 |
| Tetraethylthiuram disulfide | — | — | — | — |
| Diethylxanthogen disulfide | — | — | — | — |
| Polymerization initiators (parts in 1st/2nd stages) | | | | |
| Potassium persulfate | — | 1/0 | 1/0 | 1/0 |
| Sodium persulfate | 0/0.9 | — | — | — |
| Azobisisobutyronitrile | — | — | — | — |
| Paramenthane hydroperoxide | 0.06/0 | — | — | — |
| Sodium formaldehyde sulfoxylate | 0.02/0 | — | — | — |
| Ferrous sulfate | 0.001/0 | — | — | — |
| Emulsifiers (parts in 1st/2nd stages) | | | | |
| Sodium dodecylbenzenesulfonate | 0.3/0.2 | 0.6/0 | 0.3/0.2 | 0.6/0 |
| Polyoxyethylene nonyl phenyl ether | — | — | — | — |

TABLE 2

| Copolymer latex No. | Example 1 (I-1) | Example 2 (I-2) | Example 3 (I-3) | Example 4 (I-4) |
|---|---|---|---|---|
| Gel content (%) | 60 | 75 | 70 | 78 |
| Fine coagula | ○ | ○ | ○ | ○ |
| Dry pick resistance | 3.9 | 4.4 | 4.2 | 4.0 |
| Blister resistance (°C.) | 205 | 200 | 200 | 195 |
| Mechanical stability | ○ | ○ | ○ | ○ |

| Copolymer latex No. | Example 5 (I-5) | Example 6 (I-6) | Example 7 (I-7) | Example 8 (I-8) |
|---|---|---|---|---|
| Gel content (%) | 71 | 85 | 30 | 43 |
| Fine coagula | ○ | ○ | △ | ○ |
| Dry pick resistance | 3.9 | 4.4 | 3.7 | 3.6 |
| Blister resistance (°C.) | 210 | 190 | 230 | 220 |
| Mechanical stability | ○ | ○ | ○ | ○ |

| Copolymer latex No. | Example 9 (I-9) | Example 10 (I-10) | Example 11 (I-11) | Example 12 (I-12) |
|---|---|---|---|---|
| Gel content (%) | 45 | 35 | 56 | 38 |
| Fine coagula | ○ | △ | ○ | △ |
| Dry pick resistance | 3.6 | 3.8 | 3.9 | 4.0 |
| Blister resistance (°C.) | 220 | 230 | 215 | 230 |
| Mechanical stability | ○ | ○ | ○ | ○ |

TABLE 3

| Copolymer latex No. | Example 13 (I-13) | Example 14 (I-14) |
|---|---|---|
| Monomers (parts in 1st/2nd stages) | | |
| Butadiene | 10/15 | 10/25 |
| Styrene | 18/31 | 23/22 |
| Methyl methacrylate | 10/3 | 10/5 |
| Acrylonitrile | 5/3 | — |
| 2-Hydroxyethyl acrylate | — | — |
| Itaconic acid | 2/0 | 2/0 |
| Acrylic acid | 1/0 | 1/0 |
| Diethylaminoethyl methacrylate | 0/2 | — |
| 2-Vinylpyridine | — | 0/2 |
| Chain transfer agents (parts in 1st/2nd stages) | | |
| α-Methylstyrene dimer | 1.5/1.5 | 1/1 |
| tert-Dodecylmercaptan | — | 0.1/0.35 |
| Polymerization initiator (parts in 1st/2nd stages) | 1/0 | 1/0 |
| Potassium persulfate | | |
| Emulsifier (parts in 1st/2nd stages) | 0.3/0.2 | 0.3/0.2 |
| Sodium dodecylbenzenesulfonate | | |
| Gel content (%) | 58 | 73 |
| Fine coagula | ○ | ○ |
| Dry pick resistance | 3.8 | 4.1 |
| Wet pick resistance | 4.3 | 4.4 |
| Blister resistance (°C.) | 210 | 195 |
| Mechanical stability | ○ | ○ |

TABLE 4

| Seed latex | A | B | C |
|---|---|---|---|
| Monomers (parts) | | | |
| Divinylbenzene | 20 | 5 | 30 |
| Styrene | 76 | 93 | 56 |
| Butadiene | — | — | 10 |
| Acrylic acid | 4 | 2 | — |
| Methacrylic acid | — | — | 4 |
| Emulsifier (parts) | 30 | 25 | 30 |
| Sodium dodecylbenzenesulfonate | | | |
| Polymerization initiator (parts) | 1.5 | 1.5 | 1.5 |
| Potassium persulfate | | | |
| Average particle diameter (Å) | 320 | 350 | 270 |

TABLE 4-continued

| Seed latex | A | B | C |
|---|---|---|---|
| Gel content (%) | 98 | 88 | 99 |

TABLE 5

| | Example 15 | Example 16 | Example 17 |
|---|---|---|---|
| Seed latex | | | |
| Symbol | A | B | C |
| Amount used (parts) | 1 | 1 | 1.5 |
| Monomers (parts in 1st/2nd stages) | | | |
| Butadiene | 22/6 | 4/29 | 28/7 |
| Styrene | 48/2 | 9/32 | 35.5/2 |
| Methyl methacrylate | 10/3 | 3/11 | 10/4 |
| Acrylonitrile | 5/0 | — | 8/2 |
| Itaconic acid | 3/0 | 2/0 | 2.5/0 |
| Acrylic acid | 1/0 | 1/0 | 1/0 |
| Chain transfer agents (parts in 1st/2nd stages) | | | |
| α-Methylstyrene dimer | 1.5/0 | 0.5/1.5 | 0.5/0.5 |
| tert-Dodecylmercaptan | — | 0.2/0.4 | 0.3/0.1 |
| Emulsifier (parts in 1st/2nd stages) Sodium dodecylbenzenesulfonate | 0.25/0 | 0.03/0.15 | 0.25/0 |
| Polymerization initiator (parts in 1st/2nd stages) Potassium persulfate | 0.8/0 | 1/0 | 0.7/0.1 |
| Polymerization time (hours) | | | |
| 1st stage polymerization/2nd stage polymerization/aging | 6/2/4 | 2/6/4 | 6/2/4 |
| Gel content (%) | 81 | 46 | 61 |

TABLE 6

| | Gel content (%) | Fine coagula | Mechanical stability of coating color | Physical properties of coated paper | | | | |
|---|---|---|---|---|---|---|---|---|
| | | | | Dry pick resistance | Wet pick resistance | Wet rub | Calender roll staining resistance | Blister resistance |
| Example 15 | 81 | ○ | ○ | 4.0 | 4.3 | 92 | ⊙ | 195 |
| Example 16 | 46 | ○ | ○ | 3.7 | 4.4 | 89 | ⊙ | 220 |
| Example 17 | 61 | ○ | ○ | 3.9 | 4.5 | 93 | ⊙ | 210 |

TABLE 7

| | Examples | | | | |
|---|---|---|---|---|---|
| | 18 | 19 | 20 | 21 | 22 |
| Copolymer latex No. | (I-18) | (I-19) | (I-20) | (I-21) | (I-22) |
| Monomers (parts) | | | | | |
| Butadiene | 35 | 35 | 35 | 35 | 35 |
| Styrene | 63 | 62 | 62 | 52 | 53 |
| Acrylic acid | 2 | 2 | 1.5 | 1.5 | 2 |
| Methacrylic acid | — | 1 | 1.5 | 1.5 | — |
| Methyl methacrylate | — | — | — | 10 | — |
| Chain transfer agents (parts) | | | | | |
| α-Methylstyrene dimer | 1.5 | 1.3 | 1.0 | 1.3 | 1.0 |
| tert-Dodecylmercaptan | — | — | — | 0.2 | 0.5 |
| Gel content (%) | 74 | 80 | 83 | 76 | 81 |

TABLE 8

| | Examples | | | | |
|---|---|---|---|---|---|
| | 18 | 19 | 20 | 21 | 22 |
| Prevention of staining by exudation | ○ | ○ | ○ | ○ | ○ |
| Seasoning crack resistance Bonding strength | ○ | ○ | ○ | ○ | ○ |
| Test for boinding strength in normal state (kg/cm$^2$) | 15.3 | 14.7 | 15.1 | 14.9 | 15.7 |
| (wood failure) (%) | (100) | (100) | (100) | (100) | (100) |
| Type two soak delamination test (kg/cm$^2$) | 12.1 | 11.8 | 12.4 | 12.5 | 13.1 |
| (Wood failure) (%) | (100) | (100) | (100) | (100) | (100) |
| Type one soak delamination test (kg/cm$^2$) | 8.2 | 8.4 | 8.1 | 7.9 | 8.4 |
| (Wood failure) (%) | (80) | (90) | (85) | (75) | (85) |

TABLE 9

| | Examples | | | | |
|---|---|---|---|---|---|
| | 23 | 24 | 25 | 26 | 27 |
| Copolymer latex No. | (I-18) | (I-19) | (I-20) | (I-21) | (I-22) |
| Coatability | ○ | ○ | ○ | ○ | ○ |
| Bonding strength | | | | | |
| Test for boinding strength in normal state (kg/cm$^2$) | 19.5 | 20.0 | 19.5 | 20.5 | 20.0 |
| (wood failure) (%) | (100) | (100) | (100) | (100) | (100) |
| Type two soak delamination test (kg/cm$^2$) | 15.5 | 16.0 | 15.5 | 15.0 | 15.5 |
| (Wood failure) (%) | (100) | (100) | (100) | (100) | (100) |
| Type one soak delamination test (kg/cm$^2$) | 11.0 | 11.5 | 2.0 | 12.5 | 11.5 |
| (Wood failure) (%) | (100) | (100) | (100) | (90) | (90) |

TABLE 10

| | Examples | | |
|---|---|---|---|
| | 28 | 29 | 30 |
| Copolymer latex No. | (II-28) | (II-29) | (II-30) |
| Monomers (parts in 1st/2nd stages) | | | |
| Butadiene | 5/23 | 5/23 | 5/29 |
| Styrene | 8/46 | 8/46 | 4/42 |
| Methyl methacrylate | 3/12 | 3/12 | 5/5 |
| Acrylonitrile | — | — | 1/3 |
| Acrylamide | — | — | 0/2 |
| Itaconic acid | 2/0 | 2/0 | — |
| Fumaric acid | — | — | 2/0 |
| Acrylic acid | 1/0 | 1/0 | 1/0 |
| Chain transfer agents (parts in 1st/2nd stages) | | | |
| Dimethylxanthogen disulfide | — | 0.2/0.6 | — |
| Diethylxanthogen disulfide | 0.2/0.6 | — | — |
| Tetraethylthiuram disulfide | — | — | 0.15/0.15 |
| tert-Dodecylmercaptan | — | — | 0/0.2 |
| Polymerization initiator (parts in 1st/2nd stages) Potassium persulfate | 1/0 | 1/0 | 1/0 |
| Emulsifier (parts in 1st/2nd stages) Sodium dodecylbenzenesulfonate | 0.3/0.2 | 0.3/0.2 | 0.3/0.2 |
| Gel content (%) | 58 | 55 | 76 |
| Fine coagula | ○ | ○ | ○ |
| Dry pick resistance | 4.3 | 4.2 | 4.8 |
| Blister resistance (°C.) | 215 | 215 | 195 |
| Mechanical stability | ○ | ○ | ○ |

TABLE 11

| Copolymer latex No. | Example 31 (III-31) | Example 32 (III-32) | Example 33 (III-33) | Example 34 (III-34) | Example 35 (III-35) | Example 36 (III-36) | Example 37 (III-37) | Example 38 (III-38) | Example 39 (III-39) |
|---|---|---|---|---|---|---|---|---|---|
| Monomers (parts in 1st/2nd stages) | | | | | | | | | |
| Butadiene | 10/15 | 12/40 | 12/40 | 10/25 | 8/22 | 10/25 | 8/22 | 12/18 | 28/5 |
| Styrene | 18/31 | 15/10 | 13/15 | 23/23 | 10/44 | 18/20 | 10/43 | 15/22 | 35/2 |
| Methyl methacrylate | 10/5 | 8/2 | 3/8 | 10/5 | 5/5 | 10/5 | 5/5 | 13/13 | 15/3 |
| Acrylonitrile | 5/3 | 7/3 | 3/10 | — | 0/3 | 5/3 | 1.5/1.5 | 1.5/1.5 | 8/0 |
| Acrylamide | — | 0/2 | — | — | — | — | — | — | — |
| 2-Hydroxyethyl acrylate | — | — | 1/1 | — | — | — | — | — | — |
| Itaconic acid | 2/0 | 0/1 | 1/1 | 2/0 | 2/0 | 1/1 | 0.5/1.5 | — | 3/0 |
| Fumaric acid | — | — | — | — | — | — | 2/0 | — | — |
| Acrylic acid | 1/0 | — | 0/2 | 1/1 | 1/0 | 1/1 | 1/1 | 1/1 | 1/0 |
| Chain transfer agents (parts in 1st/2nd stages) | | | | | | | | | |
| 9,10-Dihydroanthracene | 1/0.5 | — | — | — | — | — | — | 0.5/1 | 1.5/0.5 |
| 1,4-Cyclohexadiene | — | 0.75/1.5 | — | — | — | — | 0.5/1.75 | — | — |
| 1,4-Dihydronaphthalene | — | — | 0.3/1 | — | — | 0.5/1.5 | — | — | — |
| 1,4,5,8-Tetrahydronaphthalene | — | — | — | 1/0.75 | — | — | — | — | — |
| 1,2,3,4-Tetrahydronaphthalene | — | — | — | — | 1.5/0.5 | — | — | — | — |
| tert-Dodecylmercaptan | — | — | — | — | — | 0.15/0.75 | 0.1/0.5 | 0.1/0.4 | 0.75/0.1 |
| Polymerization initiators (parts in 1st/2nd stages) | | | | | | | | | |
| Potassium persulfate | 1/0 | — | 1.5/0 | 1/0 | 0/0.8 | 1/0 | 0/0.8 | — | 1/0 |
| Sodium persulfate | — | 0.4/0.4 | — | — | — | — | — | 0/0.9 | — |
| Azobisisobutyronitrile | — | — | — | — | 1/0 | — | 1/0 | — | — |
| Paramenthane hydroperoxide | — | — | — | — | — | — | — | 0.06/0 | — |
| Sodium formaldehydesulfoxylate | — | — | — | — | — | — | — | 0.02/0 | — |
| Ferrous sulfate | — | — | — | — | — | — | — | 0.001/0 | — |
| Emulsifiers (parts in 1st/2nd stages) | | | | | | | | | |
| Sodium dodecylbenzenesulfonate | 0.3/0.2 | 0.3/0.2 | 0.2/0.2 | 0.3/0.2 | 0.2/0.1 | 0.3/0.2 | 0.3/0.2 | 0.3/0.2 | 0.6/0 |
| Polyoxyethylene nonyl phenyl ether | — | — | 0/0.1 | — | — | — | — | — | — |

TABLE 12

| Copolymer latex No. | Example 31 (III-31) | Example 32 (III-32) | Example 33 (III-33) | Example 34 (III-34) | Example 35 (III-35) | Example 36 (III-36) | Example 37 (III-37) | Example 38 (III-38) | Example 39 (III-39) |
|---|---|---|---|---|---|---|---|---|---|
| Copolymer latex | | | | | | | | | |
| Fine coagula | ○ | ○ | ○ | ○ | ○ | ○ | ○ | ○ | ○ |
| Gel content (%) | 65 | 79 | 85 | 68 | 63 | 47 | 33 | 38 | 28 |
| Coating composition Mechanical stability | ○ | ○ | ○ | ○ | ○ | ○ | ○ | ○ | |
| Physical properties of coated paper | | | | | | | | | |
| Dry pick resistance | 4.0 | 4.6 | 4.8 | 4.4 | 4.3 | 3.8 | 3.6 | 3.7 | 3.6 |
| Blister resistance (°C.) | 205 | 200 | 195 | 200 | 205 | 215 | 230 | 220 | 240 |

TABLE 13

| Copolymer latex No. | Example 40 (IV-40) | Example 41 (IV-41) | Example 42 (IV-42) | Example 43 (IV-43) | Example 44 (IV-44) | Example 45 (IV-45) | Example 46 (IV-46) | Example 47 (IV-47) |
|---|---|---|---|---|---|---|---|---|
| Monomers (parts in 1st/2nd stages) | | | | | | | | |
| Butadiene | 10/15 | 10/25 | 8/22 | 10/25 | 10/25 | 8/22 | 12/18 | 12/40 |
| Styrene | 18/31 | 23/23 | 10/44 | 18/28 | 18/20 | 10/43 | 15/22 | 13/17 |
| Methyl methacrylate | 10/5 | 10/5 | 5/5 | 10/5 | 10/5 | 5/5 | 13/13 | 3/8 |
| Acrylonitrile | 5/3 | — | 0/3 | — | 5/3 | 1.5/1.5 | 1.5/1.5 | 0/3 |
| Acrylamide | — | — | — | 1/0 | — | — | — | — |
| 2-Hydroxyethyl acrylate | — | — | — | — | — | — | — | 0/1 |
| Itaconic acid | 2/0 | 2/0 | 2/0 | 1/0 | 1/1 | 0.5/1.5 | — | 2/0 |
| Fumaric acid | — | — | — | — | — | — | 2/0 | — |
| Acrylic acid | 1/0 | 1/1 | 1/0 | 2/0 | 1/1 | 1/1 | 1/1 | 1/0 |
| Chain transfer agents (parts in 1st/2nd stages) | | | | | | | | |
| 2,5-Dihydrofuran | 0.5/2 | — | — | — | — | — | — | — |
| 2H-Chromene | — | 0.5/2.5 | — | — | — | — | — | — |
| 4H-Chromene | — | — | 1.5/1 | — | — | 0.5/1.5 | — | — |
| Xanthene | — | — | — | 1/2.5 | — | — | — | 0.5/1 |
| 3,6-Dihydro-2H-pyran | — | — | — | — | 0.5/2 | — | 0.3/1.2 | — |
| tert-Dodecylmercaptan | — | — | — | — | — | 0.1/0.4 | 0.2/0.8 | — |
| Polymerization initiators (parts in 1st/2nd stages) | | | | | | | | |

TABLE 13-continued

| Copolymer latex No. | Example 40 (IV-40) | Example 41 (IV-41) | Example 42 (IV-42) | Example 43 (IV-43) | Example 44 (IV-44) | Example 45 (IV-45) | Example 46 (IV-46) | Example 47 (IV-47) |
|---|---|---|---|---|---|---|---|---|
| Potassium persulfate | 1/0 | 1/0 | 0/0.8 | 1/0 | 1/0 | 0/0.8 | — | 1/0 |
| Sodium persulfate | — | — | — | — | — | — | 0/0.9 | — |
| Azobisisobutyronitrile | — | — | 1/0 | — | — | 1/0 | — | — |
| Paramenthane hydroperoxide | — | — | — | — | — | — | 0.06/0 | — |
| Sodium formaldehydesulfoxylate | — | — | — | — | — | — | 0.02/0 | — |
| Ferrous sulfate | — | — | — | — | — | — | 0.001/0 | — |
| Emulsifier (parts in 1st/2nd stages) Sodium dodecylbenzenesulfonate | 0.3/0.2 | 0.3/0.2 | 0.2/0.1 | 0.3/0.2 | 0.3/0.2 | 0.3/0.2 | 0.3/0.2 | 0.3/0.1 |

TABLE 14

| Copolymer latex No. | Example 40 A | Example 41 B | Example 42 C | Example 43 D | Example 44 E | Example 45 F | Example 46 G | Example 47 H |
|---|---|---|---|---|---|---|---|---|
| Copolymer latex | | | | | | | | |
| Fine coagula | ○ | ○ | ○ | ○ | ○ | ○ | ○ | ○ |
| Gel content (%) | 60 | 59 | 66 | 52 | 56 | 47 | 42 | 92 |
| Coating composition Mechanical stability | ○ | ○ | ○ | ○ | ○ | ○ | ○ | ○ |
| Physical properties of coated paper | | | | | | | | |
| Dry pick resistance | 3.9 | 4.3 | 4.4 | 4.1 | 4.3 | 4.0 | 3.7 | 4.6 |
| Blister resistance (°C.) | 205 | 210 | 205 | 210 | 205 | 215 | 225 | 200 |

TABLE 15

| Copolymer latex No. | Example 48 (V-48) | Example 49 (V-49) | Example 50 (V-50) | Example 51 (V-51) | Example 52 (V-52) | Example 53 (V-53) | Example 54 (V-54) | Example 55 (V-55) |
|---|---|---|---|---|---|---|---|---|
| Monomers (parts in 1st/2nd stages) | | | | | | | | |
| Butadiene | 10/15 | 12/40 | 10/25 | 8/22 | 10/25 | 10/25 | 8/22 | 12/18 |
| Styrene | 18/31 | 13/15 | 23/23 | 10/44 | 18/28 | 18/20 | 10/43 | 15/22 |
| Methyl methacrylate | 10/5 | 3/8 | 10/5 | 5/5 | 10/5 | 10/5 | 5/5 | 13/13 |
| Acrylonitrile | 5/3 | 3/0 | — | 0/3 | — | 5/3 | 1.5/1.5 | 1.5/1.5 |
| Acrylamide | — | — | — | — | 1/0 | — | — | — |
| 2-Hydroxyethyl acrylate | — | 1/1 | — | — | — | — | — | — |
| Itaconic acid | 2/0 | 1/1 | 2/0 | 2/0 | 1/0 | 1/1 | 0.5/1.5 | — |
| Fumaric acid | — | — | — | — | — | — | — | 2/0 |
| Acrylic acid | 1/0 | 0/2 | 1/1 | 1/0 | 2/0 | 1/1 | 1/1 | 1/0 |
| Chain transfer agents (parts in 1st/2nd stages) | | | | | | | | |
| 1,4-Hexadiene | 1/1.5 | — | — | — | 0.5/1 | — | — | — |
| 3-Phenyl-1-pentene | — | 1/0.5 | — | — | — | — | — | 0.3/1 |
| 1-Phenyl-2-pentene | — | — | 1/2 | — | — | — | 0.7/0.8 | — |
| 2-Phenyl-3-hexene | — | — | — | 0.5/2 | — | 0.5/1 | — | — |
| tert-Dodecylmercaptan | — | — | — | — | 0.3/0.7 | 0.3/1 | 0.2/0.8 | 0.1/0.7 |
| Polymerization initiators (parts in 1st/2nd stages) | | | | | | | | |
| Potassium persulfate | 1/0 | 1.5/0 | 1/0 | 0/0.8 | 1/0 | 1/0 | 0/0.8 | — |
| Sodium persulfate | — | — | — | — | — | — | — | 0/0.9 |
| Azobisisobutyronitrile | — | — | — | 1/0 | — | — | 1/0 | — |
| Paramenthane hydroperoxide | — | — | — | — | — | — | — | 0.06/0 |
| Sodium formaldehydesulfoxylate | — | — | — | — | — | — | — | 0.02/0 |
| Ferrous sulfate | — | — | — | — | — | — | — | 0.001/0 |
| Emulsifiers (parts in 1st/2nd stages) | | | | | | | | |
| Sodium dodecylbenzenesulfonate | 0.3/0.2 | 0.2/0.2 | 0.3/0.2 | 0.2/0.1 | 0.3/0.2 | 0.3/0.2 | 0.3/0.2 | 0.3/0.2 |
| Polyoxyethylene nonyl phenyl ether | — | 0/0.1 | — | — | — | — | — | — |

TABLE 16

| Copolymer latex No. | Example 48 (V-48) | Example 49 (V-49) | Example 50 (V-50) | Example 51 (V-51) | Example 52 (V-52) | Example 53 (V-53) | Example 54 (V-54) | Example 55 (V-55) |
|---|---|---|---|---|---|---|---|---|
| Copolymer latex | | | | | | | | |
| Fine coagula | ○ | ○ | ○ | ○ | ○ | ○ | ○ | ○ |
| Gel content (%) | 78 | 88 | 63 | 56 | 52 | 37 | 31 | 42 |
| Coating composition Mechanical stability | ○ | ○ | ○ | ○ | ○ | ○ | ○ | ○ |
| Physical properties of | | | | | | | | |

TABLE 16-continued

| Copolymer latex No. | Example 48 (V-48) | Example 49 (V-49) | Example 50 (V-50) | Example 51 (V-51) | Example 52 (V-52) | Example 53 (V-53) | Example 54 (V-54) | Example 55 (V-55) |
|---|---|---|---|---|---|---|---|---|
| coated paper | | | | | | | | |
| Dry pick resistance | 4.0 | 4.8 | 4.3 | 4.1 | 4.0 | 3.9 | 3.5 | 3.6 |
| Blister resistance (°C.) | 205 | 190 | 205 | 210 | 215 | 225 | 230 | 220 |

TABLE 17

| Copolymer latex No. | Example 56 (VI-56) | Example 57 (VI-57) | Example 58 (VI-58) | Example 59 (VI-59) | Example 60 (VI-60) | Example 61 (VI-61) |
|---|---|---|---|---|---|---|
| Monomers (parts in 1st/2nd stages) | | | | | | |
| Butadiene | 10/15 | 8/34 | 15/32 | 15/15 | 20/30 | 30/5 |
| Styrene | 11/44 | 14/27 | 20/22 | 18/21.5 | 11/19 | 31.5/0 |
| Methyl methacrylate | 5/5 | 6/7 | — | 6/6 | 5/5 | 15/5 |
| Acrylonitrile | 3/3 | — | 5/0 | 7/7 | 3/3 | 10/0 |
| Acrylamide | — | — | 2/0 | — | — | — |
| 2-Hydroxyethyl acrylate | — | 1/1 | — | 1/1 | — | — |
| Itaconic acid | 2/0 | 1/1 | — | — | 2/0 | 2.5/0 |
| Fumaric acid | — | — | 1/1 | 1.5/0 | — | — |
| Acrylic acid | 1/1 | — | 1/1 | 1/0 | 1/1 | 0.5/0.5 |
| Chain transfer agents (parts in 1st/2nd stages | | | | | | |
| Terpinolene | 0.1/0.1 | 0.25/0.25 | 2.0/0 | 0/0.4 | 1.0/0 | 1.5/0.5 |
| tert-Dodecylmercaptan | 0.1/0.1 | — | — | — | 1.0/1.0 | 1.0/0 |
| Carbon tetrachloride | — | 1.5/1.5 | — | — | — | — |
| Tetraethylthiuram disulfide | — | — | 0/2.0 | — | — | — |
| Diethylxanthogen disulfide | — | — | — | 2.0/2.0 | — | — |
| Polymerization initiators (parts in 1st/2nd stages) | | | | | | |
| Potassium persulfate | 1/0 | — | 0/0.5 | 0.8/0.2 | — | 1/0 |
| Sodium persulfate | — | 0.5/0.5 | — | — | 0/0.5 | — |
| Azobisisobutyronitrile | — | — | 0.8/0 | — | — | — |
| Cumene hydroperoxide | — | — | — | — | 0.05/0 | — |
| Ferrous sulfate | — | — | — | — | 0.001/0 | — |
| Sodium formaldehydesulfoxylate | — | — | — | — | 0.02/0 | — |
| Sodium ethylenediamineacetate | — | — | — | — | 0.05/0 | — |
| Emulsifiers (parts in 1st/2nd stages) | | | | | | |
| Sodium dodecylbenzenesulfonate | 0.2/0.3 | 0.3/0.2 | 0.3/0.3 | 0.3/0.2 | 0.4/0.2 | 0.6/0 |
| Polyoxyethylene nonyl phenyl ether | — | — | — | 0.1/0 | — | — |

TABLE 18

| Copolymer latex No. | Example 56 (VI-56) | Example 57 (VI-57) | Example 58 (VI-58) | Example 59 (VI-59) | Example 60 (VI-60) | Example 61 (VI-61) |
|---|---|---|---|---|---|---|
| Fine coagula | ○ | ○ | ○ | ○ | ○ | ○ |
| Gel content (%) | 53 | 65 | 73 | 35 | 78 | 39 |
| Dry pick resistance | 3.9 | 4.0 | 4.1 | 3.9 | 4.5 | 3.9 |
| Blister resistance (°C.) | 210 | 200 | 190 | 225 | 190 | 230 |
| Mechanical stability | ○ | ○ | ○ | ○ | ○ | ○ |

TABLE 19

| Copolymer latex No. | Comparative Example 1 a | Comparative Example 2 b | Comparative Example 3 c | Comparative Example 4 d |
|---|---|---|---|---|
| Monomers (parts in 1st/2nd stages) | | | | |
| Butadiene | 10/30 | 10/15 | 8/22 | 10/25 |
| Styrene | 15/24 | 18/31 | 13/47 | 23/25.5 |
| Methyl methacrylate | 5/6 | 10/5 | 5/5 | 10/5 |
| Acrylonitrile | 3/3 | 5/3 | — | — |
| Itaconic acid | 1/1 | 2/0 | — | 1/0 |
| Acrylic acid | 1/1 | 1/0 | — | 0.5/0 |
| Chain transfer agents (parts in 1st/2nd stages) | | | | |
| α-Methylstyrene dimer | — | — | 1.0/1.0 | 1.5/2.0 |
| Carbon tetrachloride | — | 4.5/0 | — | — |
| tert-Dodecylmercaptan | 1/1.5 | — | 0.2/0.3 | 1.0/3.0 |
| Polymerization initiators (parts in 1st/2nd stages) | | | | |
| Potassium persulfate | 1/0 | 0/0.5 | 1.0/0 | 1.5/0 |
| Azobioisobutyronitrile | — | 0.8/0 | — | — |
| Emulsifier (parts in 1st/2nd stages) | 0.3/0.2 | 0.3/0.2 | 0.2/0.1 | 0.2/0.1 |

TABLE 19-continued

| Copolymer latex No. | Comparative Example 1 a | Comparative Example 2 b | Comparative Example 3 c | Comparative Example 4 d |
|---|---|---|---|---|
| Sodium dodecylbenzenesulfonate | | | | |
| Gel content (%) | 75 | 63 | 53 | 2 |
| Fine coagula | X | Δ | X | X |
| Dry pick resistance | 3.1 | 2.6 | 2.1 | 1.2 |
| Blister resistance (°C.) | 180 | 200 | 210 | 260 |
| Mechanical stability | Δ | ○ | X | X |

TABLE 20

| Copolymer latex No. | Example 62 (VII-62) | Example 63 (VII-63) | Example 64 (VII-64) | Example 65 (VII-65) | Example 66 (VII-66) | Example 67 (VII-67) | Comparative Example 54 (VII-5) |
|---|---|---|---|---|---|---|---|
| Monomers parts in 1st/2nd stages) | | | | | | | |
| Butadiene | 6/27 | Same as left | Same as left | 6/27 | Same as left | Same as left | Same as left |
| Styrene | 10/39 | | | 10/39 | | | |
| Methyl methacrylate | 5/5 | | | 5/5 | | | |
| Acrylonitrile | 0/5 | | | 0/5 | | | |
| Itaconic acid | 2/0 | | | 2/0 | | | |
| Acrylic acid | 1/0 | | | 1/0 | | | |
| Chain transfer agents (parts in 1st/2nd stages) | | | | | | | |
| α-Methylstyrene dimer | 0.3/1.2 | — | — | — | — | — | — |
| Terpinolene | — | 0.3/1.2 | — | — | — | — | — |
| Tetrathiuramxanthogen disulfide | — | — | 0.2/0.6 | — | — | — | — |
| 9,10-Dihydroanthracene | — | — | — | 0.25/0.75 | — | — | — |
| Xanthene | — | — | — | — | 0.25/0.75 | — | — |
| 1,4-Hexadiene | — | — | — | — | — | 1.0/2.0 | — |
| tert-Dodecylmercaptan | 0.15/0.45 | 0.1/0.3 | 0.2/0.25 | 0.1/0.4 | 0.15/0.30 | 0.3/0.86 | 0.35/1.05 |
| Carbon tetrachloride | — | — | — | — | — | — | 3.0/0.5 |
| Polymerization initiator (parts in 1st/2nd stages) Potassium persulfate | 1.0/0 | 1.0/0 | 1.0/0 | 1.0/0 | 1.0/0 | 1.0/0 | 1.0/0 |
| Emulsifier (parts in 1st/2nd stages) Sodium dodecylbenzenesulfonate | 0.2/0.1 | 0.2/0.1 | 0.2/0.1 | 0.2/0.1 | 0.2/0.1 | 0.2/0.1 | 0.2/0.1 |
| Gel content (%) | 56 | 58 | 55 | 54 | 57 | 59 | 57 |
| Fine coagula | 0.017 | 0.03 | 0.043 | 0.026 | 0.038 | 0.041 | 0.087 |
| Dry pick resistance | 4.2 | 4.0 | 4.0 | 4.1 | 3.9 | 4.3 | 3.8 |
| Web pick resistance | 4.4 | 4.1 | 4.1 | 4.2 | 4.0 | 4.0 | 3.7 |
| Blister resistance (°C.) | 215 | 215 | 220 | 215 | 220 | 210 | 210 |
| Mechanical stability | ○ | ○ | ○ | ○ | ○ | ○ | Δ |
| (Odor) | (⊚) | (Δ) | (Δ) | (○~Δ) | (Δ) | (Δ) | (Δ) |

What is claimed is:

1. A two-stage process for producing a copolymer latex having a gel content of 5% by weight of more, comprising:
   emulsion polymerizing;
   (a) 2–80% by weight of a conjugated diene compound,
   (b) 0.1–10% by weight of an ethylenically unsaturated carboxylic acid, and
   (c) 10–97.9% by weight of an ethylenically unsaturated compound other than the components (a) and (b), the total of (a), (b) and (c) being 100% by weight, in the presence of
   (d) α-methylstyrene dimer,
   wherein in a first stage, 10–50% by weight of the total amount of the components (a), (b) and (c) are added and polymerized at 70°–80° C. for 2–6 hours after the addition of the monomer, and
   after said first stage, 50–90% by weight of the total amount of the components (a), (b) and (c) are continuously fed and polymerized in a second stage.

2. The process of claim 1, wherein said gel content is 30% or more.

3. The process according to claim 1, wherein in said first stage, the amount of (d) an α-methylstyrene dimer added in said first stage is 0.1–4 parts by weight, and the amount of (d) an α-methylstyrene dimer added in said second stage is 0–1.5 parts by weight.

4. The process according to claim 1, wherein the amount of the component (a) is 20–60% by weight, the amount of the component (b) is 0.5–70% by weight, and the amount of the component (c) is 33–79.5% by weight based on the total weight of the components (a), (b) and (c).

5. The process according to claim 1, wherein the gel content of the copolymer latex produced is 10% by weight or more.

6. The process according to claim 1, wherein the conjugated diene compound (a) is at least one compound selected from the group consisting of butadiene, isoprene, 2-chloro-1,3-butadiene and 2-methyl-1,3-butadiene.

7. The process according to claim 1, wherein the ethylenically unsaturated carboxylic acid (b) is at least one compound selected from the group consisting of monocarboxylic acids, dicarboxylic acids, dicarboxylic acid monoesters and dicarboxylic acid anhydrides.

8. The process according to claim 1, wherein the ethylenically unsaturated carboxylic acid (b) includes a dicarboxylic acid.

9. The process according to claim 1, wherein the ethylenically unsaturated carboxylic acid (b) is a combination of a dicarboxylic acid and a monocarboxylic acid.

10. The process according to claim 1, wherein the component (c), i.e. the ethylenically unsaturated compound other than the components (a) and (b) is at least one compound selected from the group consisting of aromatic alkenyl compounds, ethylenically unsaturated carboxylic acid ester compounds, ethylenically unsaturated carboxylic acid amide compounds, alkenyl cyanide compounds and ethylenically unsaturated amine compounds.

11. The process according to claim 1, wherein an ethylenically unsaturated amine is used as the component (c) in a proportion of 0.1–10% by weight based on the total monomers.

12. The process according to claim 1, wherein the amount of the components (a) is 10–60% by weight, the amount of the component (b) is 0.5–10% by weight, based on the total weight of the components (a) and (b) and as the component (c), there are used 10–65% by weight, based on the total monomers, of an aromatic alkenyl compound and 0.1–10% by weight, based on the total monomers, of an ethylenically unsaturated carboxylic acid amide and/or a hydroxylalkyl (meth)acrylate.

13. The process according to claim 1, wherein an alkenyl cyanide compound is used as the component (c) in a proportion of 0.5–40% by weight based on the total monomers.

14. The process according to claim 1, wherein the α-methylstyrene dimer consists of 40% by weight or more of 2,4-diphenyl-4-methyl-1-pentene and 60% by weight or less of 2,4-diphenyl-4-methyl-2-pentene or 1,1,3-trimethyl-3-phenylindane or both.

15. The process according to claim 1, wherein the component (d) is used in a proportion of 0.05–20 parts by weight per 100 parts by weight of the total of the components (a), (b) and (c).

16. The process according to claim 1, wherein the component (d) is used in a proportion of 0.1–10 parts by weight per 100 parts by weight of the total of the components (a), (b) and (c).

17. The process according to claim 1, wherein a polymerization initiator consisting of an inorganic polymerization initiator and an organic polymerization initiator is used during the emulsion polymerization.

18. The process according to claim 1, wherein the polymerization conversion is 90% by weight or more.

19. The process according to claim 1, wherein the components (a), (b) and (c) are polymerized in the presence of a seed latex.

20. The process according to claim 19, wherein the seed latex is obtained by polymerizing 0.1–10% by weight of an ethylenically unsaturated carboxylic acid, 0.5–40% by weight of a crosslinking monomer and 50–99.4% by weight of a conjugated diene or other unsaturated monomer or both.

* * * * *